United States Patent [19]

Borowy et al.

[11] Patent Number: 5,620,617
[45] Date of Patent: Apr. 15, 1997

[54] CIRCUITRY AND METHOD FOR MAINTAINING A PLASMA ARC DURING OPERATION OF A PLASMA ARC TORCH SYSTEM

[75] Inventors: Dennis M. Borowy, Hanover; Jeffrey L. Peterson, Lebanon, both of N.H.

[73] Assignee: Hypertherm, Inc., Hanover, N.H.

[21] Appl. No.: 544,987

[22] Filed: Oct. 30, 1995

[51] Int. Cl.$^6$ .................................................. B23K 10/00
[52] U.S. Cl. .............................. 219/121.54; 219/121.39; 219/121.44; 219/121.57
[58] Field of Search ........................ 219/121.39, 121.44, 219/121.54, 121.55, 121.56, 121.57, 75, 121.59, 121.48

[56] References Cited

U.S. PATENT DOCUMENTS

| | | |
|---|---|---|
| 3,447,322 | 6/1969 | Mastrup . |
| 3,558,973 | 1/1971 | Pochert et al. . |
| 3,770,935 | 11/1973 | Tateno et al. . |
| 4,275,287 | 6/1981 | Hiratake . |
| 4,280,042 | 7/1981 | Berger et al. . |
| 4,463,245 | 7/1984 | McNeil . |
| 4,626,648 | 12/1986 | Browning . |
| 4,692,582 | 9/1987 | Marhic . |
| 4,795,882 | 1/1989 | Hardwick et al. . |
| 4,814,577 | 3/1989 | Dallavalle et al. . |
| 4,839,499 | 6/1989 | Kotecki et al. . |
| 4,916,599 | 4/1990 | Traxler . |
| 4,996,407 | 2/1991 | Traxler . |
| 5,017,752 | 5/1991 | Severance, Jr. et al. . |
| 5,111,024 | 5/1992 | Patron et al. . |
| 5,170,030 | 12/1992 | Solley et al. . |
| 5,225,658 | 7/1993 | Yamaguchi et al. . |
| 5,296,655 | 3/1994 | Peterson et al. . |
| 5,326,955 | 7/1994 | Nishi et al. ............................ 219/121.56 |
| 5,416,297 | 5/1995 | Luo et al. ............................. 219/121.57 |
| 5,506,384 | 4/1996 | Yamaguchi .......................... 219/121.54 |

FOREIGN PATENT DOCUMENTS

| | | |
|---|---|---|
| 45-9853 | 4/1970 | Japan . |
| 63-101076 | 5/1988 | Japan . |

*Primary Examiner*—Mark H. Paschall
*Attorney, Agent, or Firm*—Testa, Hurwitz & Thibeault, LLP

[57] ABSTRACT

An arc control circuit in a plasma arc torch, having an electrode and a nozzle, maintains a plasma arc during operation of the torch. The circuit includes a power supply electrically coupled to the electrode, nozzle and a workpiece. A logic device opens a power switch electrically coupling the nozzle to the power supply, disconnecting the nozzle from the supply, when a transferred arc is formed between the electrode and the workpiece. An amplifier is electrically connected to the power supply. The amplifier compares a sensed current to an operating current. The amplifier increases the output voltage of a power supply to maintain the operating current in coordination with an increasing distance between the workpiece and the torch. A comparator is electrically connected to a logic device and compares the output voltage of the power supply to a maximum voltage. When the output voltage of the power supply exceeds the maximum voltage, the comparator sets the logic device. The logic device generates an output signal to close the power switch and reconnect the nozzle to the power supply, thereby initiating switching of the arc from the workpiece to the nozzle.

19 Claims, 3 Drawing Sheets

CIRCUITRY AND METHOD FOR MAINTAINING A PLASMA ARC DURING OPERATION OF A PLASMA ARC TORCH SYSTEM

FIELD OF THE INVENTION

The invention relates generally to the field of plasma arc torch systems and cutting processes. Further, the invention relates to circuitry and methods for maintaining a plasma arc during operation of the torch. In particular, the invention relates to circuitry and methods for maintaining a plasma arc during cutting of discontinuous materials.

BACKGROUND OF THE INVENTION

Plasma arc torch systems are widely used in the cutting of materials. A plasma arc torch system generally includes a torch, an electrode mounted within the torch, a nozzle with a central exit orifice, electrical connections, passages for cooling and arc control fluids, a swirl ring to control the fluid flow patterns, and a power supply. The torch produces a plasma arc, which is a constricted ionized jet of a plasma gas with high temperature and high momentum. Gases used in the torch can be non-reactive (e.g. nitrogen or argon) or reactive (e.g. oxygen or air).

Plasma arc torch systems use a starting circuit to initiate an arc. Referring to FIG. 1, a pilot arc relay is initially closed. A power source is turned on and the initial path for DC current from the source is between the electrode (cathode) and the nozzle (anode). A plasma gas from a gas supply flows between the electrode and the nozzle. There are several known ways to initiate the arc. The system can include electrical starting circuitry that generates a high frequency, high voltage spark discharge. After the initial high voltage spark discharge, the power supply continues to supply power to the pilot arc. The system can also include starting circuitry that implements "contact starting," which is described in commonly owned U.S. Pat. No. 4,791,268. In a contact starting system, the arc is initiated with the electrode and nozzle in physical contact. The power supply provides power and the electrode and nozzle are separated, drawing out the pilot arc. Using either approach, a pilot arc is formed between the electrode and the nozzle.

The pilot arc ionizes the plasma gas passing between the nozzle and the electrode and exiting the nozzle exit orifice. The torch is positioned adjacent the workpiece such that the arc contacts the workpiece and current begins to flow through the workpiece. The workpiece current is sensed by a current sensor, which is connected to a control circuit. The control circuit opens the pilot arc relay causing the arc current to flow through the electrode and the workpiece. Additionally, the control circuit increases the current level from the power supply to a higher level for the cutting operation. The torch is operated in this transferred plasma arc mode, characterized by the conductive flow of ionized gas from the electrode to the workpiece, during cutting of the workpiece. The cutting operation continues in the transferred arc mode until the arc is extinguished by turning off the DC power supply or by cutting to the end of the workpiece and drawing out the arc beyond the voltage capability of the power supply.

Problems arise in maintaining a continuous arc with a plasma arc torch system having the foregoing starting circuitry when the distance between the torch and the workpiece (i.e:, the standoff distance) becomes too large. This occurs when cutting a discontinuous (or grated) workpiece, when the torch is moved from one workpiece to another, or when the torch is disposed over open space. More specifically, the arc extinguishes when the torch is not adjacent the workpiece material, but is disposed over a discontinuity (or grating) or sufficient open space. Once the arc is extinguished, the starting circuitry resequences through the ignition process taking several seconds to restart the torch. Sensing the loss of workpiece current and reconnecting the nozzle does not solve the problem because the arc extinguishes before the loss of workpiece current can sensed.

One solution to this problem is described in commonly owned U.S. Pat. No. 4,996,407. Referring to FIG. 2, a constant pilot arc is maintained by a pilot arc transfer controller which includes additional electrical control circuitry incorporated into the starting circuitry. The transfer controller senses the voltage between the nozzle and the workpiece. When that voltage approaches some fixed voltage which is less than the maximum output voltage available from the power supply, the controller connects the nozzle to the power supply causing the arc to switch from the workpiece to the nozzle.

This solution works quite well, but is expensive due to the required additional voltage sensing, control and power switching circuitry. The additional circuitry is either isolated using additional, expensive analog isolation amplifiers or is floated at the high output voltage levels. Also, this solution requires the nozzle to be connected above a certain threshold voltage determined under worst case low AC input line voltage conditions. When the AC input voltage is nominal or high, controller switches the arc to the nozzle at a voltage which is lower than that the voltage required to maintain the arc. This premature switching prevents nominal or excess cutting capacity from being utilized.

Referring to FIG. 3, another solution to this problem involves a continuous connection to the nozzle through a power resistor. Current flow through the nozzle and resistor develops a voltage drop with a large resulting power loss. When the workpiece is positioned adjacent the torch, the current prefers to flow through the workpiece path due to the lower voltage drop. This approach is not preferred in hand-held torch systems because of the large power losses.

SUMMARY OF THE INVENTION

The present invention features arc control circuitry and methods for maintaining a plasma arc during operation of a plasma arc torch. The invention has been found to be particularly useful in maintaining a plasma arc during cutting of a discontinuous (or grated) workpiece, when the torch is moved from one workpiece to another, or when the torch is disposed over open space.

In one embodiment, the invention features an arc control circuit disposed in a plasma arc torch for maintaining a continuous plasma arc during operation of the torch. The circuit includes a power supply electrically Coupled to the electrode, the nozzle and the workpiece. A relay is electrically coupled to the nozzle and the positive terminal of the power supply. When a transferred arc is formed between the electrode and the workpiece, the relay is open so that the nozzle is disconnected from the positive terminal of the power supply.

The power supply operates as a closed-loop, controlled current source. The DC output voltage of the supply is continuously varied during operation of the torch to maintain an output (arc) current at a selected value. When the distance between the torch and the workpiece (i.e., standoff distance) increases (e.g., during curing of a grated workpiece, when the torch is moved from one workpiece to another, or when the torch is disposed over open space), the circuit increases the output voltage of the power supply to maintain the selected current value as the plasma arc is stretched.

The circuit includes an amplifier electrically connected to the power supply. The amplifier compares a sensed current to a selected operating current. The output signal from the amplifier controls the output voltage of the power supply. Further, the amplifier output signal is a scaled signal which represents the fraction of available output voltage from the power supply (i.e., a percentage of the output voltage). As the standoff distance changes, the output signal from the amplifier changes proportionally. The power supply uses the output signal from the amplifier to adjust its output voltage. Thus, to maintain the operating current during a cutting operation, the power supply increases (or decreases) its output voltage in coordination with an increasing (or decreasing) standoff distance.

A comparator is electrically coupled to the relay through a logic device. The comparator compares the output signal from the amplifier with a reference signal representative of the maximum allowable output voltage of the power supply. When the output signal from the amplifier reaches the reference signal, indicating that the output voltage of the power supply has reached the maximum allowable voltage, the comparator provides an output signal to the logic device for closing the relay. More specifically, the comparator output signal sets the logic device, and an output signal from the logic device closes the relay. Once the relay is closed, the nozzle is electrically coupled to the power supply and the arc switches from the workpiece to the nozzle.

In another embodiment, the invention features a plasma arc torch system including an arc control circuit incorporating the principles of the invention. The torch system includes an electrode mounted in a torch and a nozzle disposed adjacent the electrode. A gas source provides a plasma gas flow between the electrode and the nozzle. The control circuit, described above, maintains a continuous arc during operation of the torch system.

In another embodiment, the invention features a method for maintaining a continuous plasma arc during operation of a plasma arc torch system. A transferred arc is formed between the electrode and an adjacent workpiece. The output voltage of a power supply electrically coupled to the electrode and the workpiece is increased (or decreased) in coordination with an increasing (or decreasing) standoff distance.

The output voltage of the power supply is compared with a maximum allowable voltage. The arc is switched from the workpiece to the torch nozzle when the output voltage of the power supply reaches the maximum allowable voltage. To accomplish this, a relay disposed between the nozzle and the power supply is closed. Further, the current through the electrode and the nozzle is decreased from an operating current to a pilot arc after transfer to the nozzle.

The invention offers several advantages over prior techniques. One advantage is that the invention uses the existing circuitry within the power supply and thus does not require additional isolated or floating circuit. As such, plasma arc torch systems incorporating the invention can be manufactured and sold less expensively than systems utilizing other techniques. Another advantage is that the invention automatically compensates for AC input line voltage variations. Therefore, the invention does not switch the arc to the nozzle prematurely when the AC input is nominal or above nominal, such that full cutting capacity can be utilized.

BRIEF DESCRIPTION OF THE DRAWINGS

The foregoing and other objects, features and advantages of the invention will become apparent from the following more particular description of preferred embodiments of the invention, as illustrated in the accompanying drawings. The drawings are not necessarily to scale, emphasis instead being placed on illustrating the principles of the present invention.

DETAILED DESCRIPTION

Figure 1:
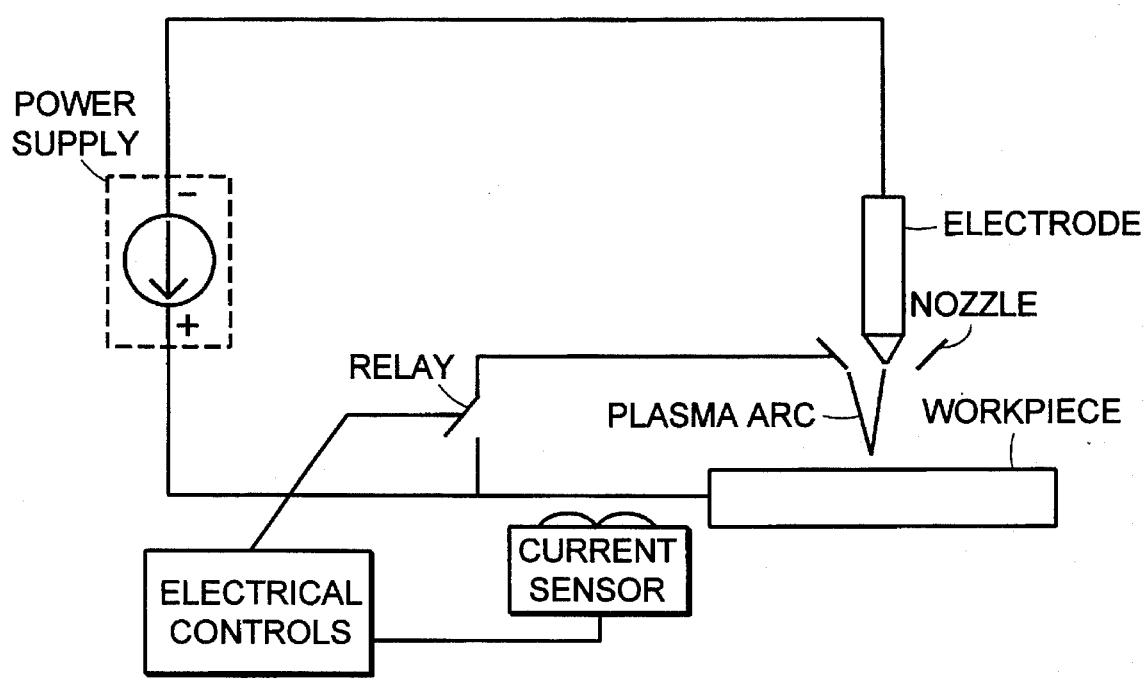
FIG. 1 is a block diagram of a prior starting circuit for a plasma arc torch.
Figure 2:
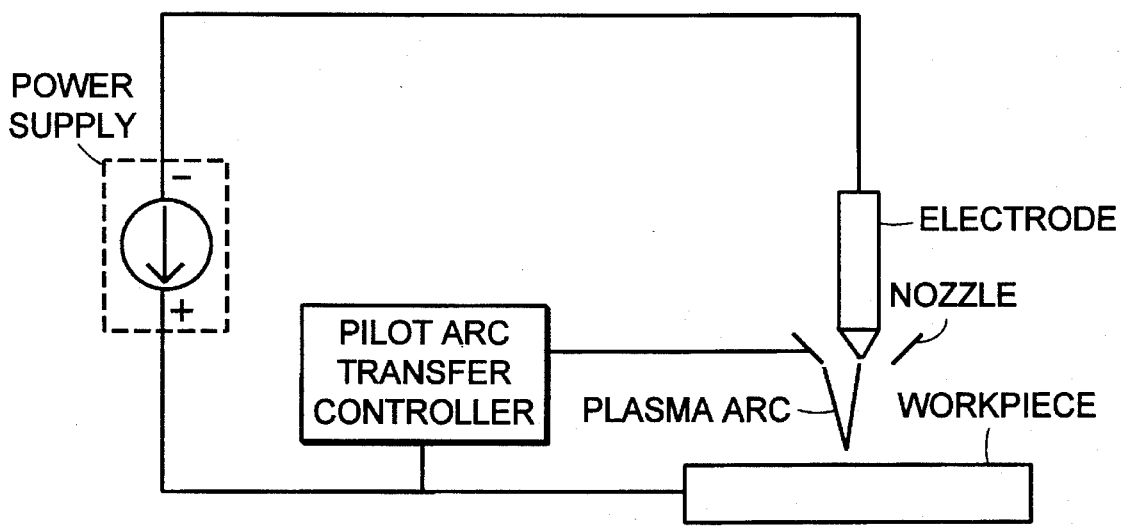
FIG. 2 is a block diagram of a prior art arc transfer control circuit for a plasma arc torch as described in U.S. Pat. No. 4,996,407.
Figure 3:
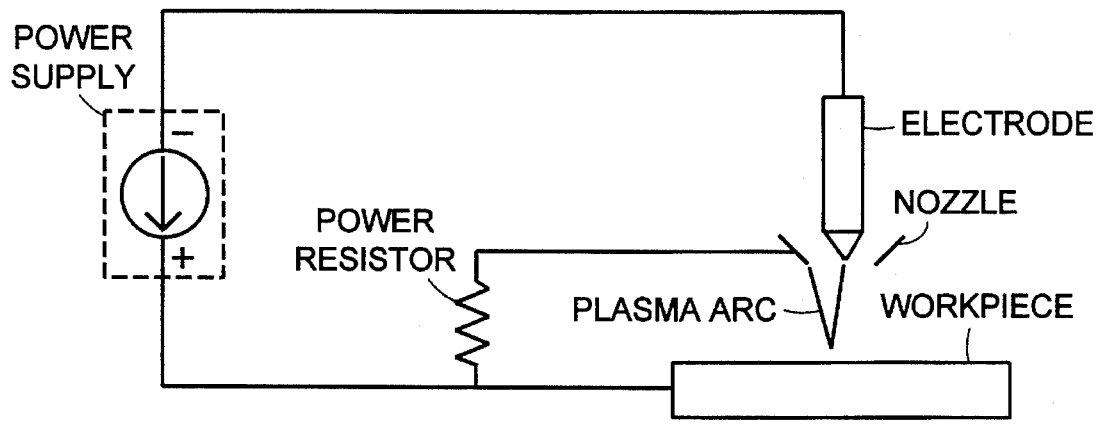
FIG. 3 is a block diagram of another prior art arc transfer control circuit for a plasma arc torch.
Figure 4:
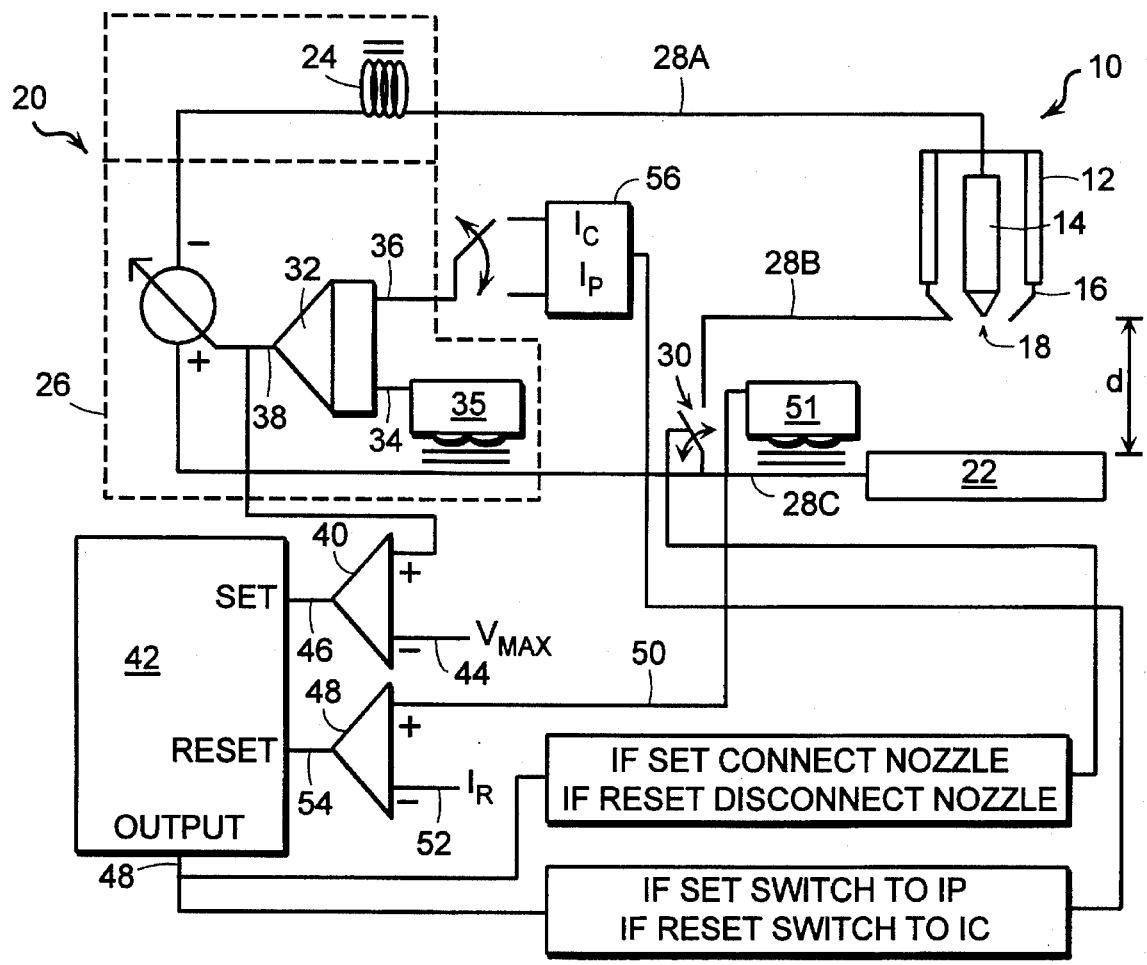
FIG. 4 is a partial schematic diagram of an arc control circuit for a plasma arc torch incorporating the principles of the invention.

FIG. 4 illustrates an arc control circuit disposed in a plasma arc torch system for maintaining a continuous plasma arc. The torch 10 is a hand-held design and includes a torch body 12 with an electrode 14 mounted within the body. A nozzle 16 with a central exit orifice 18 is mounted to the body adjacent the second comparator 48. The torch 10 also includes electrical connections, passages for cooling and arc control fluids, a swirl ring to control the fluid flow patterns, and a power source 20. The torch 10 uses known starting circuitry to form the pilot arc and transfer the arc to the workpiece 22. For example, the torch 10 can include starting circuitry that includes a Marconi generator that generates a high frequency, high voltage spark discharge. Alternatively, the torch 10 can include starting circuitry that implements "contact starting," which is described in commonly owned U.S. Pat. No. 4,791,268. Using either approach, a pilot arc is formed between the electrode 14 and the nozzle 16. The torch 10 is disposed adjacent the workpiece 22 and the starting circuitry provides a transferred plasma arc, which is a constricted ionized jet of a plasma gas with high temperature and momentum, between the electrode 14 and the workpiece 22.

As shown, the power source 20 includes and inductor 24 and a D.C. power supply 26 which provides electrical power to the starting circuitry for the start up and steady state operation of the torch 10. It is noted that the power supply 26 actually operates as a closed-loop, controlled current source. That is, the DC output voltage of the supply is continuously varied during operation of the torch 10 to maintain an output (arc) current at a selected value ($I_C$). By way of example and not limitation, the power supply 26 can produce a selected D.C. current of 20–50 amperes at 0–200 volts for one plasma arc torch system sold by Hypertherm, Inc. However, other current and voltage ranges can be used.

A conventional electrical lead set has a negative lead 28a connected from the negative output terminal of the power supply 26 to the electrode 14. Electrical leads 28b and 28c connect from positive output terminals of the power supply 26 to the nozzle 16 and workpiece 22, respectively. A pilot arc power switch 30 is electrically connected to the nozzle 16 and the positive terminal of the power supply 26 via the lead 28b. When the transferred arc is formed between the electrode 14 and the workpiece 22, the power switch 30 is opened such that the nozzle 16 is disconnected from the positive terminal of the power supply 26.

When the standoff distance (d) increases (e.g., during cutting of a grated workpiece, when the torch is moved from one workpiece to another, or when the torch is disposed over open space), the arc control circuit increases the output voltage of the power supply 26 to maintain the selected current. ($I_C$) as the plasma arc is stretched. An error amplifier 32 is electrically connected to the power supply 26. A current sensor 35 coupled to lead 28c senses the current flow through the workpiece 22. When the torch 10 is operating in the transferred arc mode, the inputs to amplifier 32 are the sensed workpiece current 34 and the selected operating current ($I_C$) 36.

The amplifier 32 compares the sensed workpiece current 34 to the selected operating current 36 and generates an output signal 38. This signal 38 is a scaled voltage representative of the fraction of available output voltage from the power supply (i.e., a percentage of the output voltage). As the standoff distance changes, the output signal 38 changes in a proportionate manner. The power supply 26 uses the output signal 38 to control its output voltage. During a cutting operation, the power supply 26 increases (or decreases) its output voltage in coordination with an increasing (or decreasing) standoff distance such that a constant operating current is maintained.

A comparator 40 is electrically connected to an input of a flip-flop 42. The comparator 40 compares the output signal 38 with a reference signal 44 representative of the maximum allowable output voltage of the power supply. In other words, the comparator 40 determines when the power supply 26 is about to run out of available output voltage for a selected operating current and standoff distance. When the power supply output voltage reaches the maximum allowable voltage, the comparator 40 provides an output signal 46 to set the flip flop 42, which is electrically coupled to the pilot arc power switch 30. The flip-flop 42 generates an output signal 48 for closing the power switch 30 and simultaneously reducing the current to the pilot arc level ($I_P$) 56. Once the power switch is closed, the nozzle 16 is electrically coupled to the power supply 26 and the arc switches from the workpiece 22 to the nozzle 16. It is noted that the current is reduced to the pilot arc level to reduce wear on the torch consumables.

A second comparator 48 is also electrically connected to an input of the flip-flop 42. Inputs to the second comparator 48 include a workpiece current 50 sensed by a current sensor 51 electrically connected to the workpiece 22 and a reference current ($I_R$) 52. When the torch 10 is positioned adjacent the workpiece 22 such that the arc contacts the workpiece, current begins to flow through the workpiece. When the workpiece current 50 exceeds the reference current 52, the comparator 48 provides an output signal 54 to reset the flip-flop 42. The flip-flop generates an output signal 54 for opening the power switch 30 and for increasing the current to the selected operating level ($I_C$) 56. When the power switch is opened, the nozzle 16 is disconnected from the negative terminal of the power supply 26 and the arc transfers to the workpiece 22.

Figure 5:
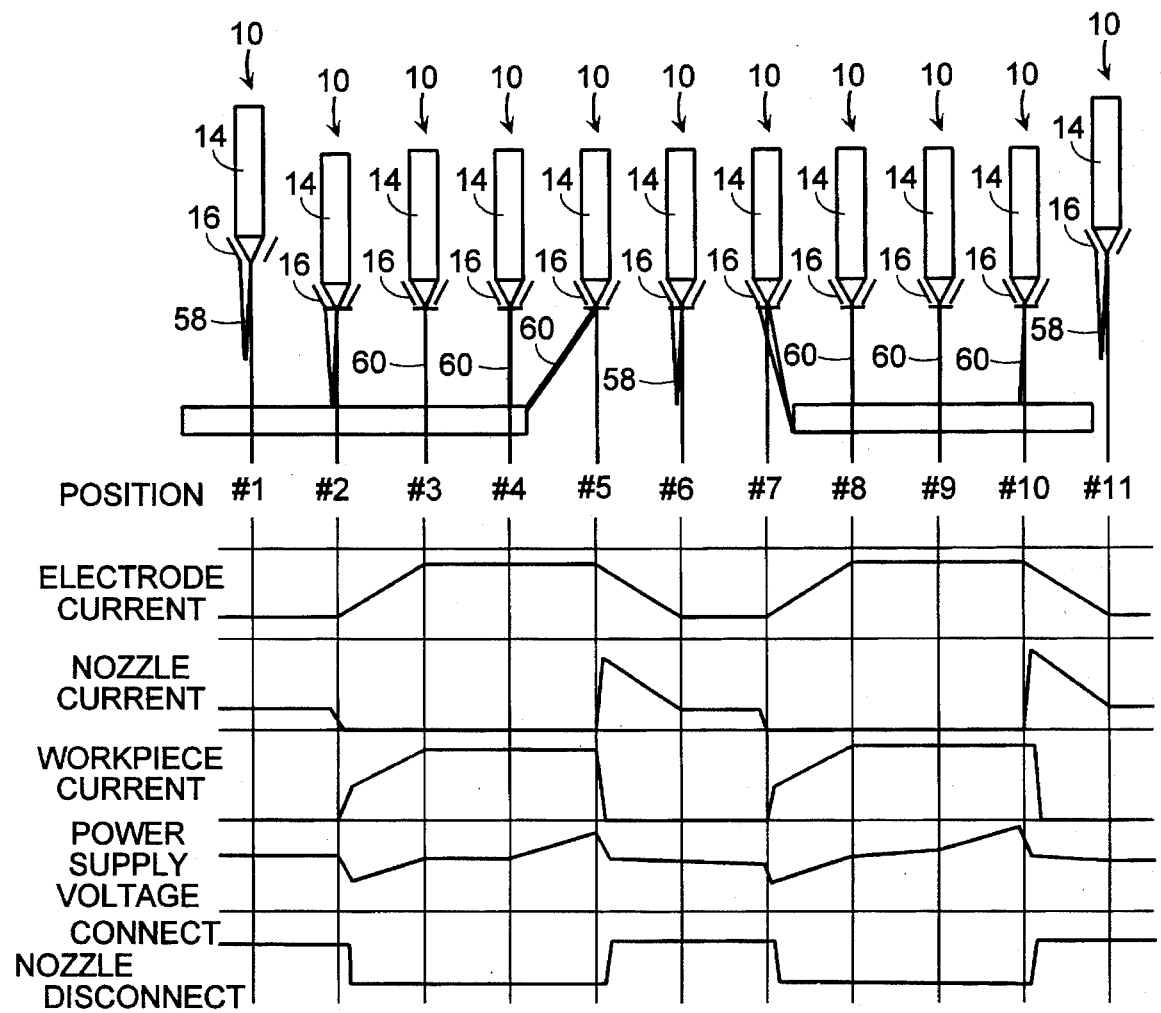
FIG. 5 is timing diagram illustrating the operation of the arc control circuit shown in FIG. 4.

FIG. 5 is timing diagram illustrating the operation of a plasma arc torch 10 including the arc control circuit shown in FIG. 4. in position #1, the torch 10 is ignited using a high-frequency, high-voltage generator or using contact starting circuitry. The pilot arc power switch is closed so that the nozzle 16 is connected to the power supply 26. The current path for the arc is between the electrode 14 and nozzle 16, and a pilot arc 58 is formed. The current amplitude is reduced to a low level, which is sufficient to maintain the pilot arc 58, for reducing the wear on the torch consumable parts (e.g, nozzle, electrode, swirl ring, etc.).

In position #2, the torch 10 is moved close to the workpiece 22 so that the plasma arc contacts the surface of the workpiece. Some of the DC current begins to flow through the workpiece 22. The output voltage of the power supply 26 is reduced to maintain a constant current amplitude. The current sensor connected to the workpiece 22 senses current and provides an output signal to the flip-flop. The flip-flop opens the pilot arc power switch disconnecting the nozzle 16 from the power supply 26 and provides an output signal to the current control circuitry. Electronic controls in the circuitry begin to ramp-up the current to the selected amplitude for cutting in the transferred arc mode. The ramp-up of the current causes a slight increase in the power supply voltage.

In position #3, the current flow is between the electrode 14 and the workpiece 22. The power supply output voltage is a function of the standoff distance. A transferred arc 60 extends from the electrode to the workpiece. The torch 10 is operating in the transferred arc cutting mode.

In position #4, cutting continues to the end of the workpiece 22 (or to a grating in the workpiece). As the torch 10 moves away from the end of the workpiece 22 and over open space, the plasma arc 60 stretches causing the power supply output voltage to increase.

In position #5, the plasma arc 60 has been stretched to near its maximum length and the power supply output voltage is approaching the maximum allowable output voltage. The arc control circuit initiates switching of the arc from the workpiece 22 to the nozzle 16 before the arc is extinguished. In particular, the comparator 40 senses when the power supply 26 is about to run out of available output voltage for a selected current. When the power supply output voltage reaches the maximum allowable voltage, the comparator 40 trips setting the flip-flop 42. The output from the flip-flop closes the pilot arc power switch connecting the nozzle 16 to the circuit. Because the electrode to nozzle voltage drop is lower than the electrode to workpiece drop, the current jumps to the nozzle 16. Electronic controls ramp down the current to the pilot arc level. In position #6, the current has ramped down to the pilot arc level. A pilot arc 58 extends from the electrode 14 to the nozzle 16, and all of the pilot arc current flows through the electrode and nozzle.

In position #7, the torch 10 is again moved closer to the workpiece 22 and a transferred arc 60 is formed as described above for position #2. In position #8, the torch 10 operates in the normal transferred arc cutting mode as described above for position #3. In position #9, normal cutting continues to the end of the workpiece 22 as described above for position #4. In position #10, the arc control circuit initiates switching of the arc from the workpiece 22 to the nozzle 16 as described above for position #5. In position #11, the torch 10 is in the pilot arc mode as described above for position #6.

Equivalents

While the invention has been particularly shown and described with reference to specific embodiments, it should be understood by those skilled in the art that various changes in form and detail may be made therein without departing from the spirit and scope of the invention as defined by the appended claims. For example, while a power switch is used to connect the nozzle, other components such as relays, switches, transistors and integrated circuits can be used.

We claim:

1. An apparatus in a plasma arc torch system having an electrode and a nozzle for maintaining a plasma arc during operation of the system, comprising:

a power supply electrically coupled to the electrode, nozzle and a workpiece;

a power witch electrically coupled to the nozzle and power supply;

a logic device electrically connected to the power switch and generating a first output signal to open the power switch and thereby disconnect the nozzle from the power supply when a transferred arc is formed between the electrode and the workpiece;

an amplifier electrically connected to the power supply, the amplifier (i) comparing a sensed workpiece current to a selected operating current and (ii) increasing and decreasing the output voltage of the power supply to maintain the selected operating current in coordination with an increase or decrease in the distance between the workpiece and the plasma arc torch; and a comparator electrically coupled to the logic device, the comparator (i) comparing the output voltage of the power supply to a maximum voltage and (ii) providing an output signal to the logic device which generates a second output signal to close the power switch, thereby initiating switching of the arc from the workpiece to the nozzle, when the output voltage of the power supply exceeds the maximum voltage.

2. The apparatus of claim 1 further comprising a first current sensor electrically coupled to the output of the power supply and providing a sensed output current to the amplifier.

3. The apparatus of claim 1 wherein the output signal from the amplifier is proportional to the distance between the workpiece and the plasma arc torch.

4. The apparatus of claim 1 further comprising:

a second current sensor electrically connected to the workpiece for sensing the current through the workpiece; and a second comparator electrically coupled to the logic device, the second comparator (i) comparing the sensed workpiece current to a reference current, and (ii) providing an output signal to the logic device which generates a second output signal to open the power switch, thereby initiating transfer of the arc from the nozzle to the workpiece, when the sensed workpiece current exceeds the transfer current.

5. The apparatus of claim 4 further comprising a controller electrically coupled to electrode and the workpiece for increasing current through the electrode and the workpiece from a pilot arc current to the selected operating current after the arc is transferred to the workpiece.

6. The apparatus of claim 1 wherein the logic device is a flip-flop.

7. The apparatus of claim 1 wherein the workpiece is formed of a grated material.

8. A plasma arc torch system comprising:

an electrode disposed in a torch;

a nozzle mounted in the torch adjacent the electrode;

a gas source providing a plasma gas flow between the electrode and the nozzle;

a control circuit for maintaining a continuous arc during operation of the torch including (a) a power source electrically coupled to the electrode, the nozzle and the workpiece, and (b) a power switch electrically coupled to the nozzle and power supply;

(c) a logic device electrically connected to the power switch and generating a first output signal to open the power switch and thereby disconnect the nozzle from the power supply when a transferred arc is formed between the electrode and the workpiece;

(d) an amplifier electrically connected to the power supply, the amplifier (i) comparing a sensed workpiece current to a selected operating current and (ii) increasing and decreasing the output voltage of the power supply to maintain the selected operating current in coordination with an increase or decrease in the distance between the workpiece and the plasma arc torch; and (e) a comparator electrically coupled to the logic device, the comparator (i) comparing the output voltage of the power supply to a maximum voltage and (ii) providing an output signal to the logic device which generates a second output signal to close the power switch, thereby initiating switching of the arc from the workpiece to the nozzle, when the output voltage of the power supply exceeds the maximum voltage.

9. The plasma arc torch system of claim 8 further comprising:

a current sensor electrically connected to the workpiece for sensing the current through the workpiece when the discontinuous material is adjacent the torch;

a second comparator comparing the sensed workpiece current to a reference current, and providing an output signal to the logic device, which generates a second output signal to open the power switch thereby initiating transfer of the arc from the nozzle to the workpiece, when the sensed workpiece current exceeds the transfer current.

10. The plasma arc torch system of claim 8 wherein the torch is hand held.

11. A method for maintaining a plasma arc during operating of a plasma arc torch, comprising:

providing a transferred arc between the electrode and the workpiece when the workpiece is disposed adjacent the plasma arc torch;

increasing and decreasing an output voltage of a power supply electrically coupled to the electrode and the material in coordination with an increase or decrease in the distance between the workpiece and the plasma arc torch;

comparing the output voltage of the power supply to a maximum voltage; and switching the arc from the workpiece to a nozzle disposed on the plasma arc torch adjacent the electrode when the output voltage of the power supply exceeds the maximum voltage.

12. The method of claim 11 wherein the providing step further comprises:

providing workpiece formed of a discontinuous material;

selecting an operating current for cutting the workpiece;

ionizing a plasma gas flowing between the electrode and the nozzle to generate a pilot arc between the electrode and the nozzle;

sensing a workpiece current when the discontinuous material is disposed adjacent the torch;

transferring the arc from the nozzle to the workpiece; and increasing the current through the electrode and the workpiece from a pilot arc current to the operating current after the arc is transferred to the workpiece.

13. The method of claim 11 wherein the switching step further comprises coupling the nozzle to the power supply by closing a power switch disposed between the nozzle and the power supply.

14. The method of claim 11 further comprising decreasing current through the electrode and the nozzle from an operating current to a pilot arc after the switching step.

15. The method of claim 11 further comprising:

sensing a workpiece current flowing when the discontinuous material is disposed adjacent the torch;

disconnecting the nozzle from the power supply by opening the power switch disposed between the nozzle and the power supply; and transferring the arc from the nozzle to the workpiece.

16. The method of claim 11 wherein the increasing step further comprises increasing the output voltage of the power supply proportionately with an increasing distance between the workpiece and the torch.

17. The method of claim 11 wherein the workpiece is a formed of a grated material.

18. A method for maintaining a plasma arc during cutting of a discontinuous material with a plasma arc torch, comprising:

providing a transferred arc between the electrode and the discontinuous material when the discontinuous material is disposed adjacent the plasma arc torch;

increasing an output voltage of a power supply electrically coupled to the electrode and the material in coordination with an increase in the distance between the discontinuous material and the plasma arc torch;

decreasing the output voltage of a power supply electrically coupled to the electrode and the material in coordination with a decrease in the distance between the discontinuous material and the plasma arc torch;

comparing the output voltage of the power supply to a maximum voltage; and switching the arc from the discontinuous material to a nozzle disposed on the plasma arc torch adjacent the electrode when the output voltage of the power supply exceeds the maximum voltage.

19. The method of claim 18 wherein the discontinuous material is a grated workpiece.

* * * * *